May 10, 1955  R. H. DALTON ET AL  2,707,850
METHOD OF WELDING ALUMINUM TO GLASS AND ARTICLE MADE THEREBY
Filed April 5, 1951

Inventors
ROBERT H. DALTON
AND RAYMOND O. VOSS
By
Attorney

United States Patent Office 2,707,850
Patented May 10, 1955

2,707,850

METHOD OF WELDING ALUMINUM TO GLASS AND ARTICLE MADE THEREBY

Robert H. Dalton and Raymond O. Voss, Corning, N. Y., assignors to Corning Glass Works, Corning, N. Y., a corporation of New York Application April 5, 1951, Serial No. 219,430

8 Claims. (Cl. 49—81)

This invention relates to glass-to-metal seals and is particularly concerned with the sealing or welding of glass to aluminum.

Glasses are customarily sealed to metals and alloys by melting the glass and contacting it with the metal. Such seals may be classified as those in which the expansion coefficients of the glass and the metal are substantially matched and those in which the expansion coefficients are dissimilar.

Most glass-to-metal seals are of the first type, in which the expansion coefficient of the glass between its setting point and room temperature is so close to that of the metal through the same temperature range that differences in contraction of the metal and the glass on cooling do not cause breaking stresses in the glass. When the expansion coefficients are so matched, the thickness of the metal member at the seal is relatively unimportant.

However, when the expansion coefficients of the glass and the metal are dissimilar, the thickness of the metal member at the seal is very important. Successful sealing with mismatched expansion coefficients requires that the metal member be very thin or thinly tapered at the area of the seal.

In the sealing of a metal tube to a glass tube, or the provision of a metal window in an apparatus composed of glass or a glass window in an apparatus composed of metal, or the use of a metallic reflector element in a hermetically sealed electric lamp, or the manufacture of a vacuum container or Dewar flask having an outer shell of metal sealed to an inner container of glass, it is desirable for some purposes to use aluminum for the metal member. Aluminum, however, has a melting point of 660° C., which is below the working points of most conventional soda-lime and borosilicate glasses. (By working point is meant that temperature at which the glass has a viscosity in the neighborhood of 10,000 poises, at which point the glass becomes readily workable in a flame.) It has hitherto been considered impossible to join an aluminum member to such a glass without melting the aluminum, and it is only by means of the well-known "Schoop" process wherein finely divided molten aluminum is forcibly projected against a glass and readily adheres thereto that the joining of aluminum to such a glass has been possible.

We have now discovered that an aluminum structural member can be successfully sealed or welded without melting, to a glass having a working point above the melting point of aluminum by the use of a sealing glass having a working point below the melting point of aluminum and a thermal expansion coefficient not more than $10 \times 10^{-7}$ per °C. different than that of the first glass, provided that the thickness of the aluminum member at the area of sealing or welding is not over 7 mils.

As is pointed out above, the successful sealing of a glass to a metal member having a substantially dissimilar expansion coefficient requires the metal member to be very thin in the area of the seal. Inasmuch as aluminum has an expansion coefficient far above that of any known glass, it is essential that an aluminum member be very thin where it contacts the glass in order to avoid the development of breaking stresses in the glass. We have found that the maximum thickness of the aluminum member in contact with the glass should not exceed 7 mils and that the thickness at its edge preferably should not exceed about 2 mils.

The sealing of one glass to another by fusion requires that their expansion coefficients be sufficiently close to prevent the development of breaking stresses in the joint on cooling. In order to successfully join an aluminum member to a glass in accordance with the present invention, we have found that the expansion coefficient of the sealing glass should not differ by more than $10 \times 10^{-7}$ per °C. from that of the higher softening glass.

The working point of the sealing glass must be below the melting point of aluminum so that it can be heated sufficiently to weld with the aluminum and with the higher working glass without melting the aluminum. Although a sealing glass having a working point only slightly below the melting point of aluminum may be utilized if great caution is used in heating it, it is preferable to employ a sealing glass having a working point of not more than about 600° C. so as to provide a greater margin of safety against accidental melting of the aluminum.

Various glasses meet the above-described requirements in expansion coefficient and working point and can be used for the present purposes. The chemical durability of many of such glasses leaves much to be desired however. Glasses which are particularly suitable include those described in the pending application of R. H. Dalton, Serial No. 651,818, filed March 4, 1946, now Patent No. 2,643,020, which glasses comprise essentially 60% to 85% PbO, 5% to 15% $Al_2O_3$ and at least one glass-forming oxide in the indicated proportion selected from the group consisting of up to 40% $B_2O_3$ and up to 20% $SiO_2$, the sum of such essential oxides being over 80%. An especially desirable composition within this range consists approximately of 75% PbO, 11% $Al_2O_3$, 11% $B_2O_3$ and 3% $SiO_2$, which has a working point of about 560° C. and an expansion coefficient of $84 \times 10^{-7}$ per °C.

Although a sheet of aluminum can be sealed by the new method to a glass surface provided the aluminum sheet does not exceed about 7 mils in thickness where it contacts the sealing glass, the present method is particularly suitable for making seals in which both the glass and the aluminum are tubular at their junction. In such seals the aluminum tube surrounds the glass tube and preferably has a wall thickness tapering to not over 1.5 to 2 mils where it contacts the glass. Reentrant angles between the sealing glass and the aluminum tube or between the sealing glass and the tubular glass member should be avoided, however.

For a better understanding of the invention and its utility, reference is had to the accompanying drawing in which.

Figure 1:
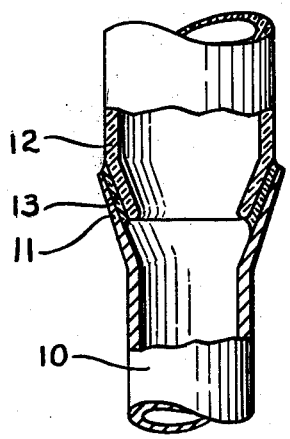
Fig. 1 is an elevation of an aluminum-to-glass tubular seal partly broken away to show the joint in section.

In Fig. 1 an aluminum tube 10 is provided with an outwardly flared end portion 11, the wall thickness of which tapers from about 7 mils through a short distance, say ¼ inch, to about 2 mils at the edge, the thickness of the aluminum tube being shown on an exaggerated scale for convenience. A glass tube 12, the end of which is shaped to conform with the flared end portion 11 of the tube 10, is joined thereto with a thin layer 13 (greatly exaggerated in thickness) of a sealing glass. Seals of this type are useful in joining a tubular glass part with a tubular aluminum member.

Figure 2:
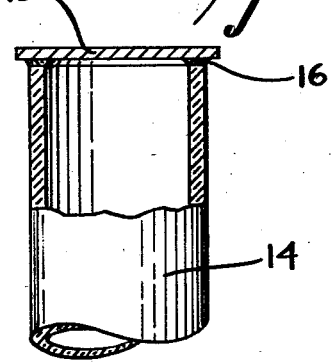
Fig. 2 is an elevation partly in section of an aluminum foil closure for a tubular glass article.

In Fig. 2 a tubular glass article 14, only a portion of which is shown, is provided with a closure comprising a sheet of aluminum 15 joined to the end of the tube 14 by means of a layer 16 of a sealing glass, the aluminum sheet 15 and the sealing glass layer 16 being greatly exaggerated in thickness for convenience. Seals of this type are useful for providing a glass container or the like with a sheet or foil aluminum closure.

Figure 3:
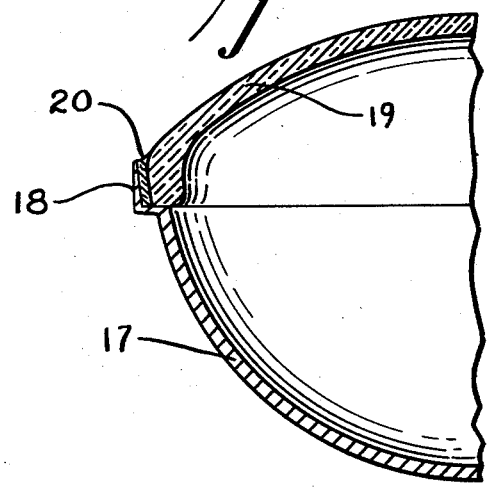
Fig. 3 is an elevation in section of a portion of an electric lamp having an aluminum-to-glass seal in accordance with the invention.

In Fig. 3 a parabolic reflector 17 composed of aluminum is provided at its periphery with an up-turned flange 18 the thickness of which tapers from about 7 mils through a short distance, say ¼ inch, to about 2 mils at the edge, the thickness of the aluminum reflector being shown on an exaggerated scale for convenience. A glass lens 19 is joined to the flange 18 with a thin layer 20 (greatly exaggerated in thickness) of a sealing glass.

Figure 4:
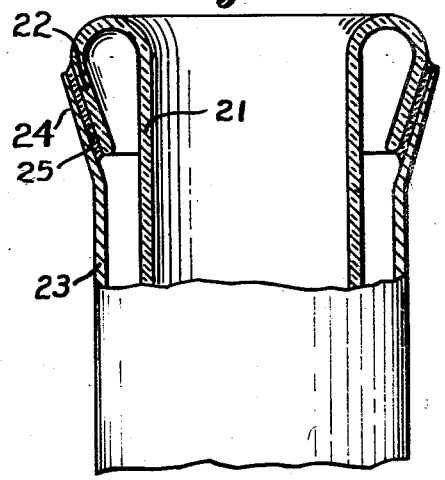
Fig. 4 is an elevation partly in section of a portion of a Dewar flask having an aluminum-to-glass seal in accordance with the invention.

In Fig. 4 a glass container 21 has its mouth turned outward and downward to form a rim 22 which spaces the wall of the container from an outer aluminum shell 23 having a mouth 24 which tapers in thickness from about 7 mils through a short distance, say ¼ inch, to about 2 mils at its edge (shown in exaggerated thickness). The container 21 and the shell 23 are joined by a thin layer 25 (shown in exaggerated thickness) of a sealing glass.

In carrying out the invention the surface of the glass member is suitably coated at the desired area of sealing with a thin layer of a sealing glass having a working point below the melting point of aluminum and preferably not over 600° C. The thickness of such layer should advantageously be uniform and preferably thin. The sealing glass may be applied while molten to the heated glass member and spread smoothly thereon, but it is preferably applied cold by spraying on to the glass member a finely divided suspension of the sealing glass in a suitable vehicle such as alcohol or a solution of cellulose nitrate. The coated glass member is then heated sufficiently to eliminate the organic matter from the coating and to fuse the powdered sealing glass to a uniform glassy layer. A small amount of Epsom salt or other suitable dispersing agent is preferably added to the alcohol suspension to retard the normally rapid settling of the powdered glass.

To make the seal the coated glass member is placed in a position adjacent the aluminum member with the sealing glass in contact with that part of the aluminum member to which it is to be sealed, and the assembly is heated to or above the working point of the sealing glass but sufficiently below the melting point of the aluminum member to avoid distortion thereof. If the glass member is thick enough to require annealing, the assembly may be cooled slowly in known manner.

For making the seals described above according to this invention magnesium, which has a melting point only slightly below that of aluminum, may be used in lieu of aluminum.

What is claimed is:

1. The method of sealing without melting a structural member composed of a metal selected from the group consisting of magnesium and aluminum to a glass having a working point above the melting point of such metal, which comprises providing a structural member of such metal having a sealing area not over 7 mils in thickness, interposing between the glass and the metal member at the sealing area a sealing glass having a working point below the melting point of the metal and a thermal expansion coefficient not more than $10 \times 10^{-7}$ per °C. different than that of the first glass, and heating the combination above the working point of the sealing glass but below the melting point of the metal to unite the sealing glass with the first glass and with the metal member.

2. The method of sealing an aluminum structural member without melting to a glass having a working point above the melting point of aluminum, which comprises providing an aluminum structural member having a sealing area not over 7 mils in thickness, interposing between the glass and the aluminum member at the sealing area a sealing glass having a working point below the melting point of aluminum and a thermal expansion coefficient not more than $10 \times 10^{-7}$ per °C. different than that of the first glass, and heating the combination above the working point of the sealing glass but below the melting point of aluminum to unite the sealing glass with the first glass and with the aluminum member.

3. A method according to claim 2 in which the sealing glass has a working point not over 600° C.

4. The method of welding an aluminum member without melting to a glass having a working point above the melting point of aluminum, which comprises providing an aluminum structural member having a sealing area not over 7 mils in thickness, interposing between the glass and the aluminum member at the sealing area a sealing glass having a working point below the melting point of aluminum and a thermal expansion coefficient not more than $10 \times 10^{-7}$ per °C. different than that of the first glass, said sealing glass comprising essentially 60% to 85% PbO, 5% to 15% $Al_2O_3$, and at least one glass-forming oxide in the indicated proportion selected from the group consisting of up to 40% $B_2O_3$ and up to 20% $SiO_2$, the sum of such essential oxides being over 80%, and heating the combination above the working point of the sealing glass but below the melting point of aluminum to unite the sealing glass with the first glass and with the aluminum member.

5. An article comprising a structural member composed of a metal selected from the group consisting of magnesium and aluminum and having a sealing area not over 7 mils in thickness, a member composed of a glass having a working point above the melting point of the metal, and a sealing glass having a working point below the melting point of the metal and a thermal expansion coefficient not more than $10 \times 10^{-7}$ per °C. different than that of the first glass forming a hermetic seal between the sealing area of the metal member and the first glass.

6. An article comprising a structural member composed of aluminum and having a sealing area not over 7 mils in thickness, a member composed of a glass having a working point above the melting point of aluminum, and a sealing glass having a working point below the melting point of aluminum and a thermal expansion coefficient not more than $10 \times 10^{-7}$ per °C. different than that of the first glass forming a hermetic seal between the sealing of the aluminum member and the first glass.

7. An article according to claim 6 in which the sealing glass has a working point not over 600° C.

8. An article comprising a structural member composed of aluminum and having the sealing area not over 7 mils in thickness, a member composed of a glass having a working point above the melting point of aluminum, and a sealing glass having a working point below the melting point of aluminum and a thermal expansion coefficient not more than $10 \times 10^{-7}$ per °C. different than that of the first glass forming a hermetic seal between the sealing area of the aluminum member and the first glass, said sealing glass comprising essentially 60% to 85% PbO, 5% to 15% $Al_2O_3$ and at least one glass-forming oxide in the indicated proportion selected from the group consisting of up to 40% $B_2O_3$ and up to 20% $SiO_2$, the sum of such essential oxides being over 80%.

(References on following page)

References Cited in the file of this patent

UNITED STATES PATENTS

| | | |
|---|---|---|
| 2,015,484 | Lilienfeld | Sept. 24, 1935 |
| 2,190,528 | Wright | Feb. 13, 1940 |
| 2,217,398 | Baier | Oct. 8, 1940 |
| 2,362,171 | Swanson | Nov. 7, 1944 |
| 2,362,172 | Swanson | Nov. 7, 1944 |
| 2,412,836 | Rose | Dec. 17, 1946 |
| 2,450,130 | Gordon | Sept. 28, 1948 |
| 2,499,854 | Ellefson | Mar. 7, 1950 |
| 2,522,990 | Cartun | Sept. 19, 1950 |
| 2,549,504 | Messana | Apr. 17, 1951 |

FOREIGN PATENTS

| | | |
|---|---|---|
| 625,466 | Great Britain | June 28, 1949 |
| 634,657 | Great Britain | Mar. 22, 1950 |